(12) United States Patent
Wappler et al.

(10) Patent No.: US 11,880,737 B2
(45) Date of Patent: Jan. 23, 2024

(54) DYNAMIC RFID PORTAL MODULATION

(71) Applicant: Surgere, LLC, Uniontown, OH (US)

(72) Inventors: William John Wappler, Cuyahoga Falls, OH (US); Robert William Fink, Hudson, OH (US); Charles Edwin Dressler, Wadsworth, OH (US)

(73) Assignee: Surgere, LLC, Uniontown, OH (US)

( * ) Notice: Subject to any disclaimer, the term of this patent is extended or adjusted under 35 U.S.C. 154(b) by 279 days.

(21) Appl. No.: 17/314,512

(22) Filed: May 7, 2021

(65) Prior Publication Data

US 2022/0358301 A1 Nov. 10, 2022

(51) Int. Cl.
*G06K 7/10* (2006.01)
*G06Q 10/087* (2023.01)

(52) U.S. Cl.
CPC ..... *G06K 7/10475* (2013.01); *G06K 7/10356* (2013.01); *G06Q 10/087* (2013.01)

(58) Field of Classification Search
CPC .......... G06K 7/10475; G06K 7/10356; G06K 7/10009; G06Q 10/087
See application file for complete search history.

(56) References Cited

U.S. PATENT DOCUMENTS

| | | | | |
|---|---|---|---|---|
| 6,148,291 A * | 11/2000 | Radican | ............... | G06Q 10/087 705/28 |
| 7,102,509 B1 * | 9/2006 | Anders | .................. | G06Q 10/08 340/870.18 |
| 7,518,511 B1 * | 4/2009 | Panja | ..................... | G07G 1/009 340/568.1 |
| 7,633,392 B2 * | 12/2009 | Neuwirth | ............. | G06Q 10/087 340/572.1 |
| 7,973,645 B1 * | 7/2011 | Moretti | ............. | G06K 7/10356 340/572.2 |

(Continued)

OTHER PUBLICATIONS

Jul. 28, 2022 International Search Report issued in corresponding Application No. PCT/US22/27661.

*Primary Examiner* — Michael Jared Walker
(74) *Attorney, Agent, or Firm* — Clements Bernard Walker; Richard A. Walker; Christine Wilkes Beninati

(57) ABSTRACT

Disclosed herein are methods and systems for dynamic portal modulation. A method of dynamic radio frequency identification (RFID) modulation comprises identifying in a structure a plurality of different assets to be loaded or unloaded; wherein each asset of the plurality of different assets is of a known identification and includes a passive RFID tag, and all passive RFID tags of the plurality of different assets are not the same. The method also comprises identifying a selected structural opening of a plurality of structural openings to be utilized with unloading or loading of the plurality of different assets, wherein each structural opening of the plurality of structural openings is equipped with an RFID portal including a reader, and each RFID portal includes at least power, sensitivity, mode and off settings; and individually, dynamically tuning the power, sensitivity and mode settings of the RFID portal of the selected structural opening based on the known identification of the plurality of assets and RFID tags utilized in the selected structural opening such that the reader of the RFID portal of the selected structural opening reads every RFID tag of the plurality of different assets to avoid missed reads.

25 Claims, 10 Drawing Sheets

FIG-1

(56) References Cited

U.S. PATENT DOCUMENTS

| | | | |
|---|---|---|---|
| 9,361,777 B2* | 6/2016 | Wappler | G08B 13/2462 |
| 9,400,964 B2 | 7/2016 | Wappler et al. | |
| 9,760,826 B1* | 9/2017 | Stine | G06K 7/10079 |
| 10,217,075 B1* | 2/2019 | Ward | G06Q 10/083 |
| 10,891,450 B2* | 1/2021 | Wappler | G06K 19/0723 |
| 2002/0073114 A1* | 6/2002 | Nicastro | G06Q 10/06 |
| | | | 715/255 |
| 2005/0253704 A1* | 11/2005 | Neuwirth | G06Q 10/087 |
| | | | 340/8.1 |
| 2006/0022800 A1* | 2/2006 | Krishna | G06K 7/0008 |
| | | | 340/10.2 |
| 2006/0022801 A1* | 2/2006 | Husak | G06K 7/0008 |
| | | | 340/10.5 |
| 2006/0022815 A1* | 2/2006 | Fischer | G06K 7/10356 |
| | | | 340/505 |
| 2006/0170565 A1* | 8/2006 | Husak | G06K 17/0029 |
| | | | 340/8.1 |
| 2007/0008184 A1* | 1/2007 | Ho | G08G 1/015 |
| | | | 340/941 |
| 2007/0268138 A1* | 11/2007 | Chung | G08B 13/2462 |
| | | | 340/572.1 |
| 2008/0086320 A1* | 4/2008 | Ballew | G06Q 10/00 |
| | | | 705/342 |
| 2008/0174432 A1* | 7/2008 | Ulrich | G06K 7/0008 |
| | | | 340/572.1 |
| 2008/0270076 A1* | 10/2008 | Breed | G06F 3/0233 |
| | | | 702/185 |
| 2009/0008450 A1* | 1/2009 | Ebert | G06Q 10/08 |
| | | | 235/439 |
| 2009/0024491 A1* | 1/2009 | Choubey | G06Q 10/087 |
| | | | 705/28 |
| 2010/0044435 A1* | 2/2010 | Ahlberg | G06K 7/0004 |
| | | | 235/440 |
| 2011/0010275 A1* | 1/2011 | Hull | G06Q 10/087 |
| | | | 705/28 |
| 2012/0268253 A1* | 10/2012 | Tuttle | G01S 11/10 |
| | | | 340/10.1 |
| 2013/0162459 A1* | 6/2013 | Aharony | G01S 13/04 |
| | | | 342/27 |
| 2013/0257594 A1* | 10/2013 | Collins | G06Q 10/0833 |
| | | | 340/10.1 |
| 2014/0018059 A1* | 1/2014 | Noonan | H04W 52/283 |
| | | | 455/419 |
| 2014/0074667 A1* | 3/2014 | Smith | G01S 13/74 |
| | | | 705/28 |
| 2015/0051941 A1* | 2/2015 | Bell | G06Q 10/06315 |
| | | | 705/7.25 |
| 2015/0154525 A1* | 6/2015 | Wappler | G06Q 10/06315 |
| | | | 705/7.25 |
| 2015/0154535 A1* | 6/2015 | Wappler | G06Q 10/087 |
| | | | 705/28 |
| 2015/0381947 A1* | 12/2015 | Renkis | G06V 20/52 |
| | | | 348/159 |
| 2016/0048709 A1* | 2/2016 | Butler | H01Q 9/285 |
| | | | 340/10.51 |
| 2016/0117458 A1* | 4/2016 | Hermans | G16H 10/65 |
| | | | 705/2 |
| 2016/0180123 A1* | 6/2016 | Forster | G06K 7/10019 |
| | | | 340/10.51 |
| 2016/0189093 A1 | 6/2016 | Wappler et al. | |
| 2016/0350706 A1* | 12/2016 | Endries | G06Q 10/08 |
| 2017/0017874 A1* | 1/2017 | Park | G06K 19/07796 |
| 2017/0023377 A1* | 1/2017 | Burtner | G08B 13/2462 |
| 2017/0230790 A1* | 8/2017 | Skomra | H04M 1/72454 |
| 2018/0300673 A1* | 10/2018 | Wappler | G01S 13/751 |
| 2019/0026690 A1* | 1/2019 | Wappler | G06Q 10/06 |
| 2019/0311164 A1* | 10/2019 | Teter | G06K 7/10415 |
| 2020/0161742 A1* | 5/2020 | Leitermann | H01Q 1/2216 |
| 2022/0358455 A1* | 11/2022 | Wappler | G06Q 10/0833 |

\* cited by examiner

Door in Use

| Data Element | Value | Data Element | Value |
|---|---|---|---|
| Lane Assignment | LAN000012345 | Lane Assignment | LAN000012345 |
| Created Date | 3/30/2021 9:23:00 | Created Date | 3/30/2021 9:23:00 |
| Pick List ID | 678901234 | Pick List ID | 678901234 |
| Door | Dock 25 | Door | Dock 25 |
| Origin | OEM Production Facility | Origin | OEM Production Facility |
| Destination | Supplier Facility | Destination | Supplier Facility |
| Carrier | ABC Transportation | Carrier | ABC Transportation |
| Trailer | ABC-123 | Trailer | ABC-123 |
| Asset Type | Plastic-24X24X24 | Asset Type | Plastic-24X24X24 |
| Activity ID | Active | ID | Active |
| Environmental ID | 1102 | ID | Metal Halo Present |
| Configuration ID | 2301 | ID | PSR0003 |
| Power | 18.25 | Power | 18.25 |
| Sensitivity | -60 | Sensitivity | -60 |
| Reader Mode | M=8 | Reader Mode | M=8 |

| | | | |
|---|---|---|---|
| | Door NOT in Use | | |
| Data Element | Value | Data Element | Value |
| Lane Assignment | NULL | Lane Assignment | NULL |
| Created Date | NULL | Created Date | NULL |
| Pick List ID | NULL | Pick List ID | NULL |
| Door | NULL | Door | NULL |
| Origin | NULL | Origin | NULL |
| Destination | NULL | Destination | NULL |
| Carrier | NULL | Carrier | NULL |
| Trailer | NULL | Trailer | NULL |
| Asset Type | NULL | Asset Type | NULL |
| Activity ID | Not Active | ID | Not Active |
| Environmental ID | Dock 25 | ID | Standard |
| Configuration ID | 1000 | ID | 1000 |
| Power | 0 | Power | 0 |
| Sensitivity | 0 | Sensitivity | 0 |
| Reader Mode | M=8 | Reader Mode | M=8 |

400, 402, 404, 406, 408, 410, 412, 414, 416, 418, 420, 422, 424, 426, 428, 430

DYNAMIC RFID PORTAL MODULATION

FIELD OF THE DISCLOSURE

The present disclosure relates generally to Radio Frequency Identification (RFID) tag asset tracking systems and methods. These systems and methods may be used to track a wide variety of manufactured goods. More specifically, the present disclosure relates to RFID portal modulation in such environments.

BACKGROUND OF THE DISCLOSURE

Asset tracking and inventory management are complex components of most modern businesses. The tracking of inventory levels, orders, sales, and deliveries is critical to understanding the global picture of a company's inventory levels. Companies may use inventory management systems to avoid product overstock and outages. However, an important underlying component of a robust inventory management system is a precise count, identification and location of the inventory itself. Thus, there is a need for methods and systems which track assets by keeping a precise count and location information for each inventory item.

In recent years, it has been known that inventory tracking and management can be accomplished more expeditiously by utilizing RFID systems. One example of such a system may include an RFID reader and multiple passive RFID tags attached to inventory items, where the RFID reader may be an active device that sends an interrogation signal to which the nearby RFID tags can respond. If an RFID tag is within range to receive the interrogation signal and if the strength of the received interrogation signal is sufficient to power the passive RFID tag, then the RFID tag can respond whereby identification (ID) information of the RFID tag is modulated and sent back to the RFID reader. The RFID reader can thus identify one or more RFID tags within range. It is noted that the communication between an RFID reader and an RFID tag does not require line-of-sight transmission. Instead, the electromagnetic RFID waves, typically in the low frequency (LF), high frequency (HF), or ultra-high frequency (UHF) ranges) can pass through walls or other solid objects. In the case of an RFID tag embedded within an item to be tracked, for example, the RFID signals can also traverse other RFID tags and corresponding items.

Another aspect of RFID technology is that an RFID reader is capable of communicating with multiple RFID tags at the same time, thereby enabling a quick analysis of inventory information or multiple items, such as items that may be stored on a shelf, placed on a pallet, etc.

For a typical RFID deployment in, e.g., a manufacturing environment, there are a multitude of asset types that are affixed with RFID tags and acquire a signal as they pass through a RFID portal. This presents a challenge because each of the assets may be of a different size, made of a different material, etc. Traditional RFID portals, which are fixed devices including a reader and antenna, are typically tuned to general power and sensitivity settings in an attempt to apply a universal setting. This, however, results in sacrifices being made at an asset level in terms of, e.g., lack of read accuracy, etc. RFID portal/reader settings impact the reach and breadth of the RFID signal and what can be enabled to be read or not read by the portal. It is an immense challenge to find singular or universal settings that work for the universe of material needed to be read. For example, a large-scale manufacturer may have hundreds of different asset types, different tag types, placements, materials, environmental factors, etc. Finding a common setting is challenging and implementation of it can be limiting.

Accordingly, there exists a need for systems and methods to improve acquisition, ease deployment and reduce acquisition of unwanted RFID reads, for example, at an adjacent truck loading/unloading location.

Embodiments of the invention address the foregoing need and others.

BRIEF SUMMARY OF THE DISCLOSURE

The ability to utilize an understanding of what material is to be loaded and leverage this information to, e.g., dynamically tune the RFID portal, through real-time modification of reader power, sensitivity and/or mode settings allows for tremendous improvements to acquisition, ease of deployment, and significantly reduces the acquisition of unwanted RFID reads, e.g., at an adjacent truck loading/unloading location. The herein described dynamic RFID portal modulation systems and methods thus advantageously solve issues associated with current RFID deployments.

According to an embodiment, a method of dynamic radio frequency identification (RFID) modulation comprises identifying in a structure a plurality of different assets to be loaded or unloaded; wherein each asset of the plurality of different assets is of a known identification and includes a passive RFID tag, and all passive RFID tags of the plurality of different assets are not the same. The method also comprises identifying a selected structural opening of a plurality of structural openings to be utilized with unloading or loading of the plurality of different assets, wherein each structural opening of the plurality of structural openings is equipped with an RFID portal including a reader, and each RFID portal includes at least power, sensitivity, mode and off settings; and individually, dynamically tuning the power, sensitivity and mode settings of the RFID portal of the selected structural opening based on the known identification of the plurality of assets and RFID tags utilized in the selected structural opening such that the reader of the RFID portal of the selected structural opening reads every RFID tag of the plurality of different assets to avoid missed reads.

According to another embodiment, an edge device management system for dynamic radio frequency identification (RFID) modulation comprises a plurality of different assets configured to be loaded or unloaded; wherein each asset of the plurality of different assets is of a known identification and includes a passive RFID tag, and all passive RFID tags of the plurality of different assets are not the same. The edge device management system also comprises a plurality of RFID portals including a reader; wherein the edge device management system is configured to identify a selected structural opening of a plurality of structural openings to be utilized with loading or unloading the plurality of different assets, wherein each structural opening of the plurality of structural openings is equipped with an RFID portal of the plurality of RFID portals including a reader, and each RFID portal includes at least power, sensitivity, mode and off settings; and wherein the edge device management system is further configured to individually, dynamically tune the power, sensitivity and mode settings of the RFID portal of the selected structural opening based on the known identification of the plurality of assets and RFID tags utilized in the selected structural opening such that the reader of the RFID portal of the selected structural opening reads every RFID tag of the plurality of different assets to avoid missed reads.

BRIEF DESCRIPTION OF THE DRAWINGS

The presently disclosed systems and methods illustrated and described herein with reference to the drawings, in which:

FIG. 9 is a diagram illustrating an example table displaying information including door or portal status (in use) for display on a device configured to be in communication with herein described systems, according to embodiments; and similarly FIG. 10 is a diagram illustrating an example table displaying information including door or portal status (not in use) for display on a device configured to be in communication with herein described systems, according to embodiments.

DETAILED DESCRIPTION OF THE DISCLOSURE

Figure 1:
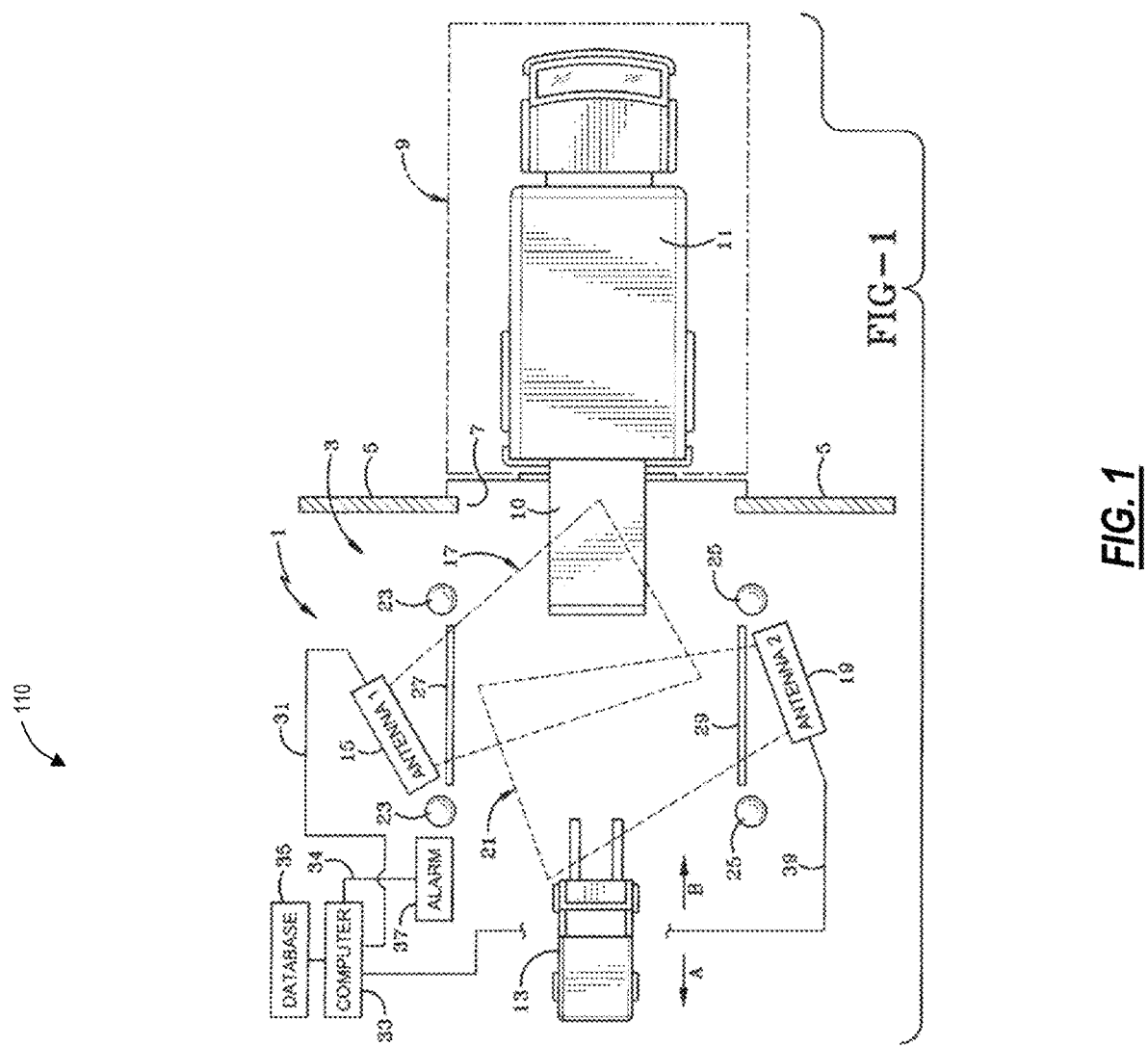
FIG. 1 is a diagram illustrating a top view of a delivery area of a structure including a gate system.

Advantageously, the ability to utilize an understanding of what material is to be loaded and leverage this information to, e.g., dynamically tune the RFID portal, through real-time modification of reader power, sensitivity and/or mode settings allows for tremendous improvements to acquisition, ease of deployment, and significantly reduces the acquisition of unwanted RFID reads, e.g., at an adjacent truck loading/unloading location, according to embodiments. The herein described dynamic RFID portal modulation systems and methods thus advantageously solve issues associated with current RFID deployments.

More particularly, embodiments of the invention utilize details regarding, e.g., when and where material will be loaded and what specific material types will be loaded. According to embodiments and through the understanding of what material will be present, the RFID portal/reader is dynamically configured to the settings, e.g., power, sensitivity and mode, with the highest rate of acquisition and minimal creation of excess read energy to acquire data with the highest potential accuracy and also minimize excess energy not needed for acquisition.

In further accordance with embodiments, the process of dynamic configuration can repeat during each loading and/or unloading activity. In addition, portals not in use and next to an active portal may be tuned down to avoid unwanted read energy at adjacent data capture points. Advantageously, the entire RFID portal/reader network at the client level may be managed based on known activity, and the nature and complexity of the activity.

The herein described approach to RFID portal/reader modulation advantageously occurs in real-time, utilizing real world production and activity data unique to the end user and the RFID portal/reader settings are managed by an internally developed edge device management platform, according to embodiments.

Thus, embodiments of the invention allow for the creation of RFID settings at an activity level, as opposed to a universal level. As large scale consumers of RFID can commonly have hundreds of different types of material, RFID tags, types, etc., embodiments of the invention result in a significant increase in data capture and accuracy, as well as enable the RFID portal/reader to work with nearly any RFID tag type.

It is noted that the use of different tag types within a deployed network of RFID tags is currently challenging if the types of RFID tags have different readability profiles. This has been a limiting factor to RFID deployment since its inception. However, according to embodiments, by understanding the activity, material, and tag type utilized for each asset, the tag type limitation is eliminated. This can play an important role as new RFID tag types are introduced. RFID deployments are commonly limited in terms of introducing new tag technology into an existing deployment if the new technology improves dramatically better than the previous technology due to the limitation of universal settings, and unknown activity. Accordingly, embodiments of the invention advantageously enable greater acquisition accuracy, reduce reads of unwanted material, allow for the simultaneous utilization of multiple tag types, as well as allow for the introduction of new technology without compromising or complicating the process and end result.

Moreover, according to embodiments, by employing the portal tuning in a dynamic fashion, a specific portal can be advantageously adjusted to read the assets known to be presenting themselves at the specific portal, so a universal setting is not needed because the portal settings are now created based on the exact load and unload activity happening at a given time and at a given, e.g., dock door at a manufacturing facility. This is significant advantage over prior portal tuning techniques wherein typical general settings are pushed down to all the portals in the manufacturing environment from a middleware layer located between the actual reader and software application that the data is going to.

Advantageously, with connection to a manufacturers' production demand in terms of, e.g., what their suppliers need from a container/asset standpoint and an understanding from a transportation standpoint as to, e.g., what trailers or other carriers are scheduled to pick up what materials/assets and at what time, and where, e.g., which particular door at the facility, it can be determined what to load on that particular trailer or other carrier down to the asset level. Accordingly, by knowing what and where material/assets are to be loaded and when, the portal setting are dynamically modulated or modified to the correct or most accurate settings for that portal. Thus, a high reliability in terms of reads are able to be achieved, according to embodiments of the invention.

Advantageously, based on, e.g., data from customers an understanding is obtained regarding activity or non-activity happening at each door of a facility. For a door not planned to be in use, the portal may be dynamically tuned off or to a very low power setting to conserve resources. Obtaining information/notification of what will be loaded or unloaded at a particular door allows using this intelligence to dynamically tune that particular portal to the optimal settings in terms of, e.g., power, mode and sensitivity to acquire accurate reads for those assets.

Through integration with, e.g., a client's shipping system, the following can be advantageously determined, according to embodiments: 1) identification of particular assets 2) arriving at what particular door, 3) in what particular containers and 4) with what specific RFID tags thereon, and thus be able to know what optimal settings the portal/reader should be and tune accordingly.

In general, all suppliers and OEMs order, ship, receive, pack, and consume parts, as well as process assets and containers at their facilities. This commonality may be used to standardize supply-chain methodologies and to allow for automated information management and selective data sharing. All businesses desire simplicity and commonality, including speed to implementation, low cost, enhanced breadth and depth, and adherence to supply constraints. Implementing systems and methods that standardizes management points and provides transparency related to supplier and/or manufacturer inventory would be advantageous. These systems and methods may include manual data interaction and/or automated data recordation using passive transmitter tags, for example. A common integration and analytics platform may be provided to manage and provide asset data. The platform may leverage passive transmitter tag scanning portals and may provide a 99.9% data collection tolerance. Passive transmitter tags may include enhanced encoding ability and versatility for correlating data to associated assets (such as packing, parts, and products).

Referring now to FIG. 1, depicted therein is a directional gate system 1. The reader will readily understand that the fundamentals of electromagnetic wave propagation, antenna design, and signal processing are well within the prior art and readily understood by one familiar therewith and thus are not herein described in detail.

Gate system 1 is configured to work in conjunction with a building or structure 3 which includes a wall 5 defining an opening 7. Opening 7 is typically embodied in an entranceway into structure 3 at a loading dock area 9, and may be selectively sealable with a door (not shown). In the loading dock area 9, a truck 11 may be positioned proximate opening or dock door 7 with a platform 10 extended therefrom and through opening 7 for transferring items between truck 11 and structure 3. A forklift 13 is provided in FIG. 1 for reference and may be used to aid in transferring items between truck 11 and structure 3.

As shown in FIG. 1, a first antenna 15 is disposed within structure 3. First antenna 15 is a directional antenna having a first radiation pattern 17 emanating therefrom in a particular direction. As shown in FIG. 1, first antenna 15 is angled such that first radiation pattern 17 is angled generally towards opening 7. An item emanating a signal in the proper frequency will be received by first antenna 15 when the item is within first radiation pattern 17. Conversely, inasmuch as first antenna 15 is a directional antenna, the signal will not be received by the first antenna 15 when the item is outside of first radiation pattern 17. A second antenna 19 is also disposed within structure 3. Second antenna 19 is a directional antenna having a second radiation pattern 21 emanating therefrom in a particular direction. As shown in FIG. 1, second antenna 19 is angled such that second radiation pattern 21 is angled generally away from opening 7. Similar to first antenna 15, any properly formatted signal emanating from an item within second radiation pattern 21 will be received by second antenna 19, as second antenna 19 is a directional antenna. Also, similar to first antenna 15, second antenna 19 will not receive signals emanating from outside second radiation pattern 21.

First antenna 15 is positioned behind a first set of bumpers 23 while second antenna 19 is positioned behind a second set of bumpers 25. First set of bumpers 23 provide protection for first antenna 15 while second set of bumpers 25 provide protection for second antenna 19 and both sets of bumpers 23 and 25 are made from sturdy material, such as steel or reinforced aluminum. Bumpers 23 and 25 are provided to protect antennas 15 and 19, respectively, as warehouses and stockroom areas are often busy with forklifts 13 and other various equipment such as dollies moving thereabout. First antenna 15 is further positioned behind first shield 27 while second antenna 19 is further positioned behind second shield 29. While first set of bumpers 23 and second set of bumper 25 are preferably metallic, first shield 27 and second shield 29 are preferably made from plastic or another similar material which efficiently facilitates the passing through of electromagnetic signals. First shield 27 and second shield 29 are formed from non-metallic material to allow first antenna 15 and second antenna 19 to send and receive signal therethrough.

As further shown in FIG. 1, first antenna 15 is connected to a computer 33 by way of a first connection 31. First connection 31 may be a wired or wireless connection for providing a communications mechanism between first antenna 15 and computer 33. Computer 33 may be any style of computing device, and may include a processor (not shown) coupled with a memory (not shown). Computer 33 is also connected to an alarm 37 by way of an alarm connection 34. Alarm connection 34 may be a wired or wireless communication mechanism and provides for data communication between computer 33 and alarm 37. Alarm 37 may be any style of alarming type of system which includes an audible alarm, a silent alarm, or any other type of alert system, including alerting a particular personnel of building 3. Similar to first antenna 15, second antenna 19 is connected to computer 33 by way a second connection 39. Second connection 39 may be a wired or wireless connection and provides a mechanism for transferring data between computer 33 and second antenna 19. First antenna 15 and second antenna 19 provide information and data relating to signals received thereby and transfers this data to computer 33 by way of first connection 31 and second connection 39, respectively.

As an item emanating a signal passes between first antenna 15 and second antenna 19, first antenna 15 and second antenna 19 receive the signal along with its varying signal strength as it passes through first radiation pattern 17 and second radiation pattern 21, respectively. This information is transferred to computer 33 by way of first connection 31 and second connection 39, wherein computer 33 processes the information. Database 35 accordingly stores data provided to computer 33.

Figure 2:
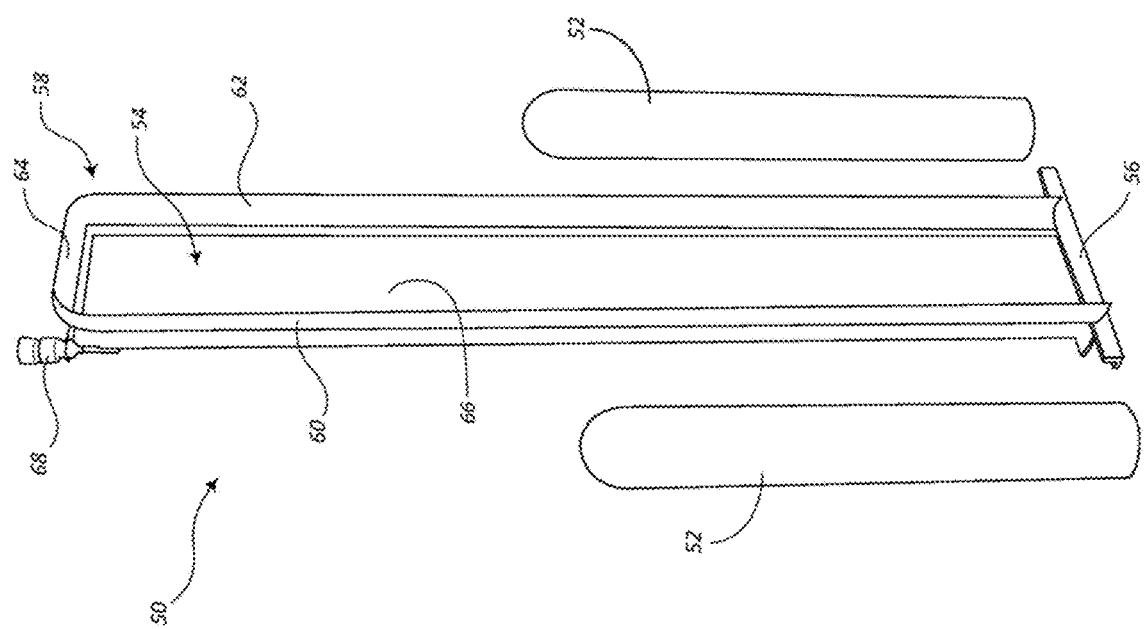
FIG. 2 is a diagram illustrating a perspective view of an RFID reader antenna and shroud assembly.

Gate system 1 is preferably implemented using radio frequency identification (RFID) technology, which a non-line of sight technology. In particular, a directional RFID system as disclosed in Applicant's U.S. Pat. No. 10,891,450 may be employed; other RFID systems may be employed, as well. For example, as shown in FIG. 2, an antenna assembly 50 may be employed for each of the afore-described first antenna 15 and second antenna 19 and instead thereof. Antenna assembly 50 may be installed at a temporary or permanent location. It may be desired to install one or more bollards 52 or other safety bumpers or posts to protect the stationary antenna assembly 50 from accidental contact with forklifts, pallet trucks, scooters, or other moving objects.

The antenna assembly 50 includes an antenna 54, or reader antenna. The antenna 54 may be a planar antenna or sector antenna for creating a radiation pattern within a sector (e.g., fanned-shaped pattern of 60 degree, 90 degree, 120 degree, or other suitable angle, about a horizontal axis). The antenna 54 may be supported in a permanent arrangement on a floor (e.g., the floor of a warehouse) by a base 56. Surrounding the outer edges of the antenna 54 is a shroud assembly 58. As illustrated, the shroud assembly 58 may include a left shroud element 60, a right shroud element 62, and a top shroud element 64. The shroud assembly 58 may further include a bottom shroud element (not shown), which may be positioned near the base 56.

The left shroud element 60 is configured to reduce the EM radiation pattern of the antenna 54, and, in particular, may reduce the EM backscatter radiation that can be sensed at a left side of a fanned-out pattern extending from a front face 66 of the antenna 54. Similarly, the right shroud element 62 is configured to reduce the EM radiation pattern of the antenna 54, and, in particular, may reduce the EM backscatter radiation that can be sensed at a right side of the fanned-out pattern extending from the front face 66 of the antenna 54. The shroud assembly 58 may include just the left and right shroud elements 60, 62 for limiting the reading zone in only a lateral direction. However, the shroud assembly 58 may further include the top shroud element 64, which may be configured to reduce the EM radiation pattern in a vertical direction. Specifically, the top shroud element 64 may limit the height of the EM backscatter radiation sensing pattern to prevent communication with RFID tags 14, 18 shown in FIG. 4 on a level (e.g., an upper floor) where interrogation is not wanted.

Figure 4:
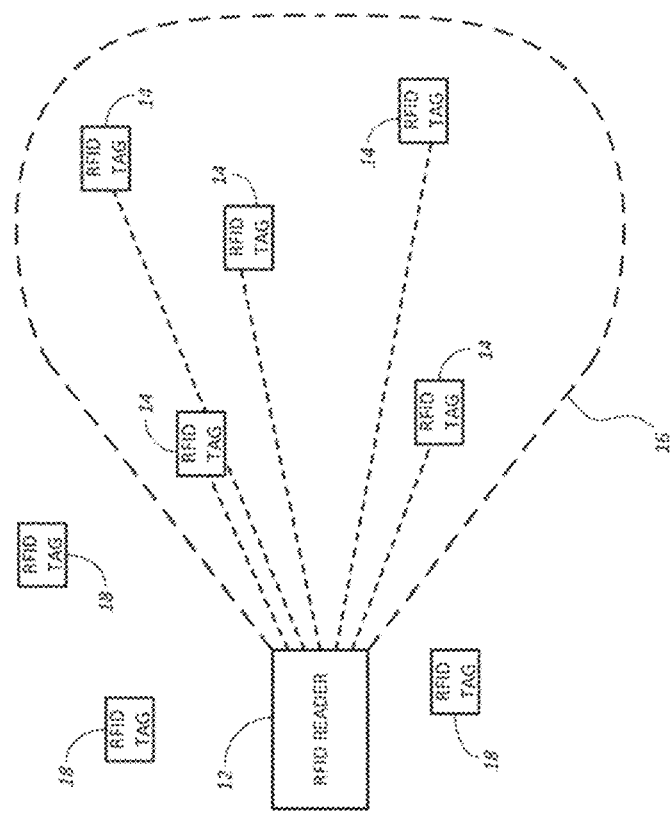
FIG. 4 is a diagram illustrating a system for tracking an identifying items in which the RFID reader antenna and shroud assembly of FIG. 2 may be employed.

With further reference to FIG. 4, the antenna assembly 50 may be part of an RFID reader apparatus (e.g., see RFID reader 12) and may operate with other elements of the RFID reader apparatus to send interrogation signals to RFID tags within a sensing zone (e.g., sensing zone 16) and then receive ID information from one or more RFID tags. The RFID reader apparatus may further include, in addition to the antenna 54 and shroud assembly 58, an indicator 68. The indicator 68 may include one or more lights, an audio output device, and/or other indication elements. In use, the RFID reader may cause the indicator 68 to provide an indication to nearby personnel when the RFID reader is actively in the process of reading RFID tags. The indicator 68 can also indicate when an error has occurred in the reading process and/or that the items need to be read again and may be configured to indicate other activities and/or conditions of the RFID reader.

Thus, the shroud assembly 58 may be configured to control or restrict the reach and/or breadth of the EM waves transmitted by the antenna 54 and the EM backscatter energy received by the antenna 54. The shroud assembly 58 may be specifically designed to constrain the RFID read zone and to eliminate cross reads or stray reads from RFID tags 18 outside the RFID read zone. Therefore, the shroud assembly 58 may be configured to ensure that only the RFID tags 14 within the specific read zone are read and to minimize unwanted RFID tag reads from RFID tags 18 outside the sensing zone 16.

Figure 3:
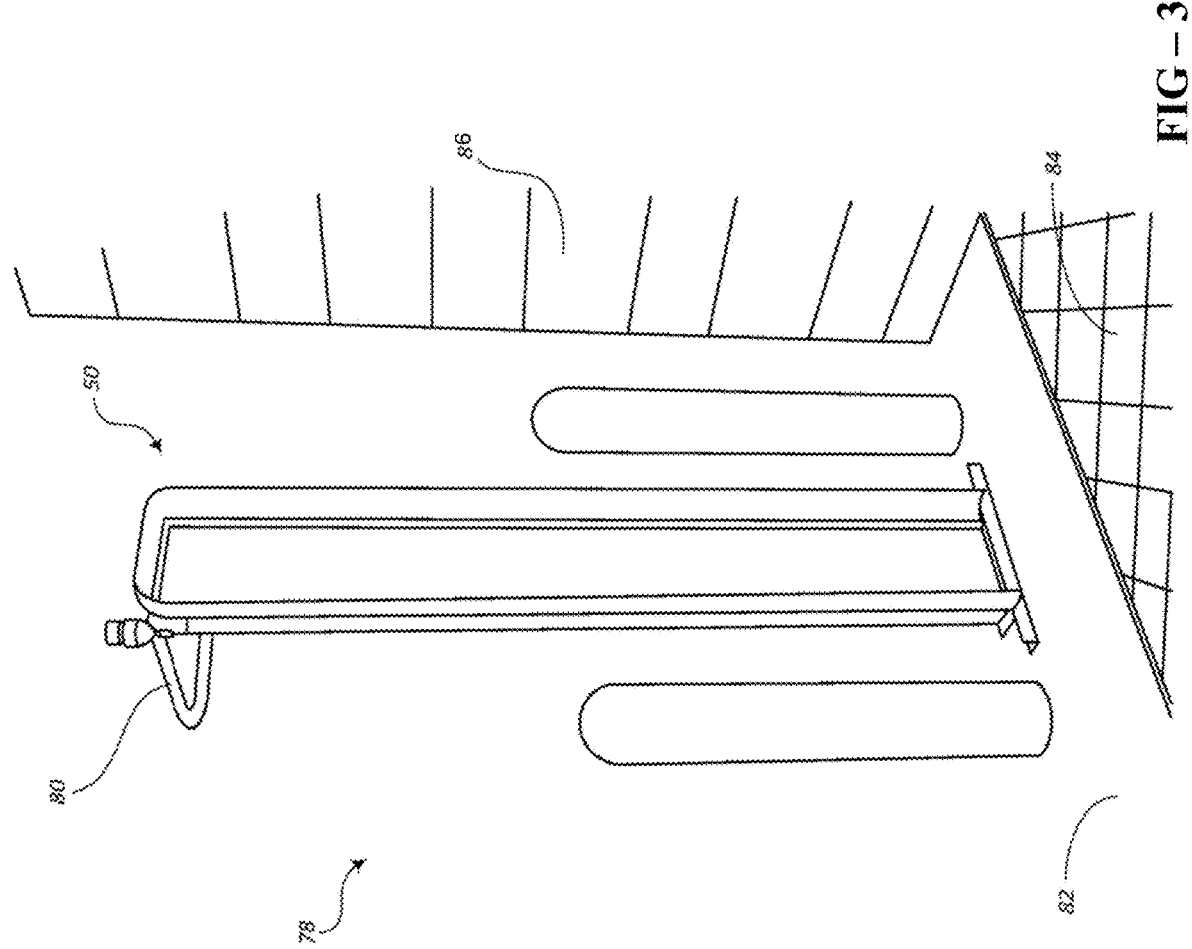
FIG. 3 is a diagram illustrating a perspective view of the RFID reader antenna and shroud assembly of FIG. 2 being used in a warehouse environment.

FIG. 3 shows a perspective view of the antenna assembly 50 of FIG. 2 installed in a warehouse environment 78. As shown, the antenna assembly 50 is connected to cables 80 or other electrical conductors for connection with an RFID reader (not shown) and/or power source (not shown). The antenna assembly 50 is installed on a warehouse floor 82 within the warehouse environment 78 and may be positioned with a radiation/sensing pattern that extends out over an area on the warehouse floor 82 which may include an industrial scale 84 or other feature that may be used during a process of shipping or receiving bulk items.

In this environment, a plurality of items may each have an RFID tag and may be brought to a bay 86 in the warehouse environment 78 for loading onto a truck for shipment to a retail store or other location. While the items may be placed on the scale 84 to be weighed, the RFID reader may be configured to transmit interrogations signals within a sensing zone generally corresponding to the space above the scale 84. By restricting the sensing zone created by the antenna 54 and shroud assembly 58, the antenna assembly 50 is thereby configured to exclude other outlying spaces outside the specific electromagnetic radiation pattern.

The multiple RFID tags within the sensing zone can respond with their ID information, which can be recorded by the RFID reader. An inventory system may include the RFID reading apparatus for identifying items in the sensing zone and may further include the industrial scale 84 for recording the shipping weight of these items. According to various implementations, the sensing zone may be used for recording item information when items are received (imported) at the warehouse environment 78 and/or when items are to be shipped (exported) from the warehouse environment 78. Still other implementations may include other passageways, intersections, thoroughfares, etc., within or associated with the warehouse environment 78 through which the items may pass on their way to another area (e.g., other areas within the same warehouse, from one room to another, etc.). Thus, the antenna assembly 50 may be placed, either permanently or temporarily, at any strategic location (e.g., in front of the bay 86, near a scale 84, or at other locations) where the items can be tracked.

Figure 5:
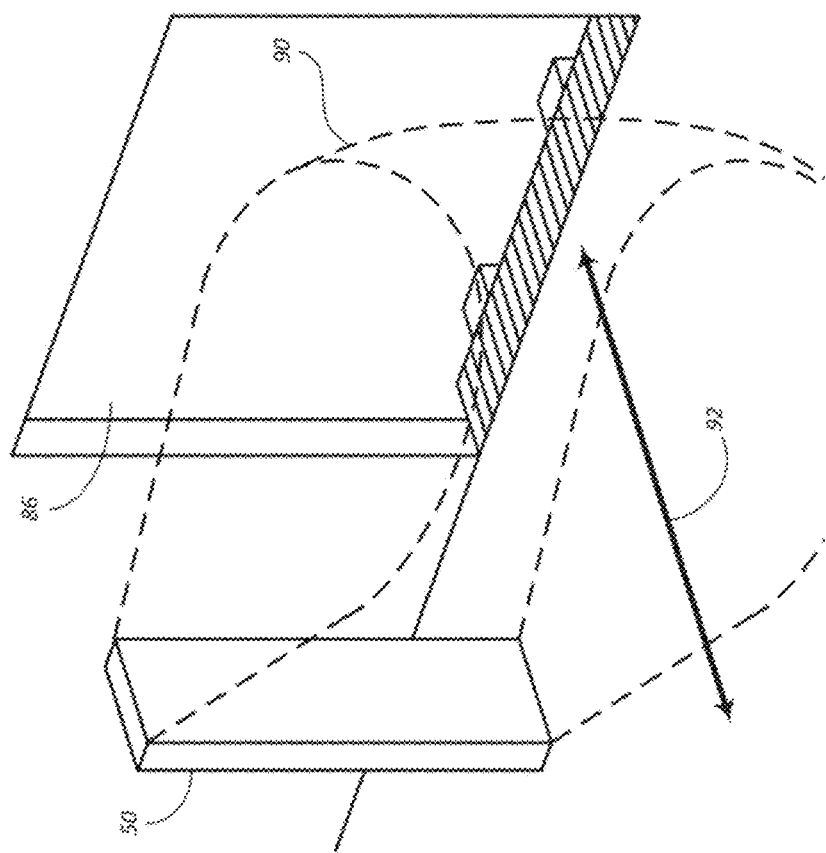
FIG. 5 is a diagram illustrating a perspective view of a limited backscatter sensing zone of the system of FIG. 4.
Figure 6:
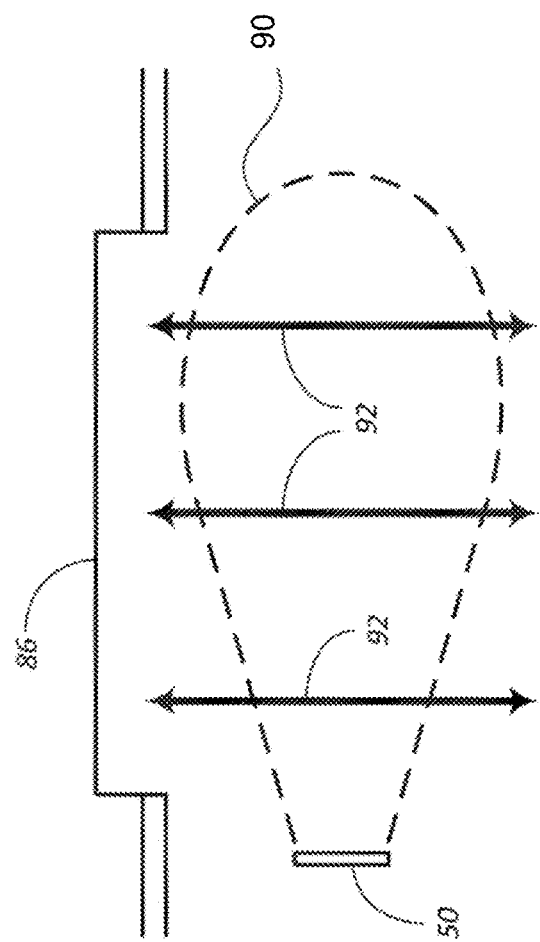
FIG. 6 is a diagram illustrating the top view of the limited backscatter sensing zone of the system of FIG. 4.

FIG. 5 is a perspective view of a three-dimensional reading zone 90 of the assembly 50 shown in FIG. 4, which may include a reduced space based on the effects of the shroud assembly 58. FIG. 6 shows the reading zone 90 from a top view. As shown in FIGS. 4 and 5, the three-dimensional reading zone 90 (backscatter sensing zone) has a fan-shaped radiation pattern that extends orthogonally from the assembly 50. A path of travel 92 for route of items is also illustrated therein. The shroud assembly reduces the sides (width) of the zone 90, but does not block the zone 90 in the orthogonal direction, which may create an open-faced type of pattern.

It is noted that while examples of suitable antenna systems and configurations are shown in FIGS. 1-6, it will be appreciated that other antenna systems and configurations could be employed.

Figure 7:
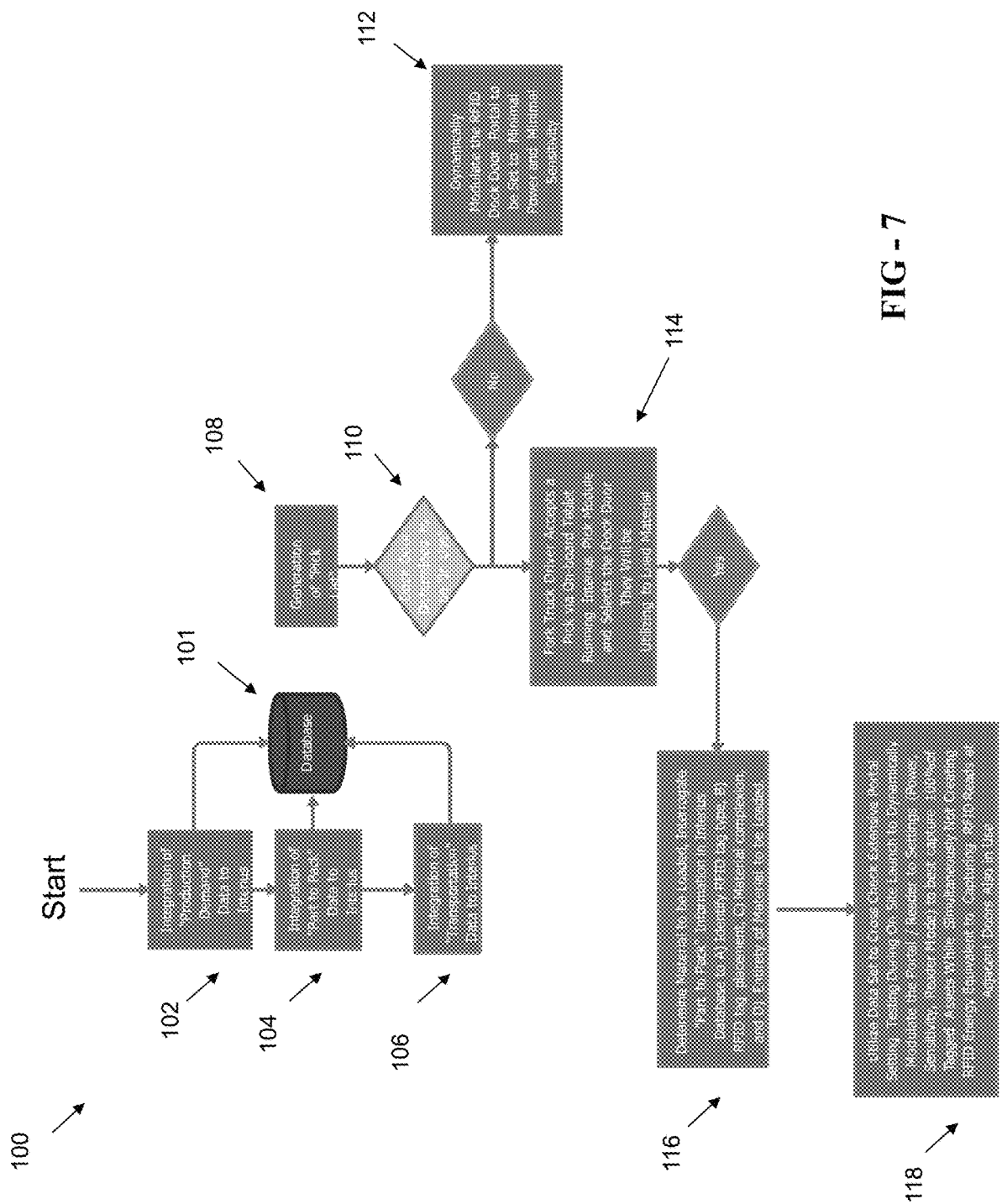
FIG. 7 is a block diagram of a flowchart illustrating a method/system of dynamic modulation, according to embodiments.

Referring now to FIG. 7, set forth therein is a block flow diagram illustrating an example method/system 100, according to embodiments of the invention to further demonstrate the advantageous application of the dynamic modulation in a manufacturing environment. As shown therein, method 100 comprises at step 102 an integration of product demand data to an Internet of Things (IoT) platform (INTERIUS/COS Database 101) which provides data analytics and is a proprietary cloud based software which can use RFID sensors to gather activity data, which is then used to track assets, such as reusable automotive containers and other parts, through each link in a supply chain. Product demand data may include details regarding production plans for volume of finished goods and/or vehicle production, and the parts required from the supply base needed to meet the production plan. Step 104 shown in FIG. 7 comprises the integration of part to pack data to the IoT Platform (INTERIUS/COS Database 101). The part to pack data may include, e.g., a) the container, rack or corrugate box each part ships in; b) pack and/or part specifications including size/dimensions, material type such as plastic, steel, etc., weight, packs per pallet, and whether the material is stackable; and c) what RFID brand, model, chipset is utilized on the pack or asset and location on the asset where the tag is placed. Step 106 comprises the integration of transportation data to the IoT platform (INTERIUS/COS Database 101). The transportation data may comprise, e.g., details regarding what carriers have been scheduled to pick up material at the manufacturing facility, how many trailers will be arriving, the time the trailers will be arriving, and identification of the predetermination destination for the carrier. Step 108 of FIG. 7 illustrates a generation of pick list. More particularly, an INTERIUS/COS Database 101 generated pick list may utilize, e.g., production demand, real time inventory at the manufacturer and supply base, and scheduled transportation to determine what assets/containers need to be loaded on outbound trailers, as well as the quantity of the same. In Step 110, it is determined whether a dock door is in use. If the dock door is not in use or scheduled to be in use, and as illustrated in Step 112, the RFID dock door portal may be dynamically modulated to be tuned downed and thus set to minimal power and minimal sensitivity setting, or possibly to an off position to conserve energy resources. As shown in Step 114, if the dock door is in use or scheduled to be in use, e.g., a fork truck driver accepts a pick via on-board tablet running the IoT Platform (INTERIUS/COS Database 101) and selects the dock door they will be utilizing to load the material/assets. Step 116 then comprises determining the material/assets to be loaded, interrogate part to pack information in the INTERIUS/COS Database 101 to, e.g., a) identify RFID tag type; b) RFID tag placement; c) material complexion; and d) entirety of material to be loaded. At Step 118, the data set may be utilized to cross check extensive portal setting testing during on site launch to dynamically modulate the portal/reader to settings (e.g., power, sensitivity, reader mode) to best capture about 100% of tagged assets while simultaneously not creating RFID energy equivalent to capturing RFID reads at adjacent doors that also may be in use.

Figure 8:
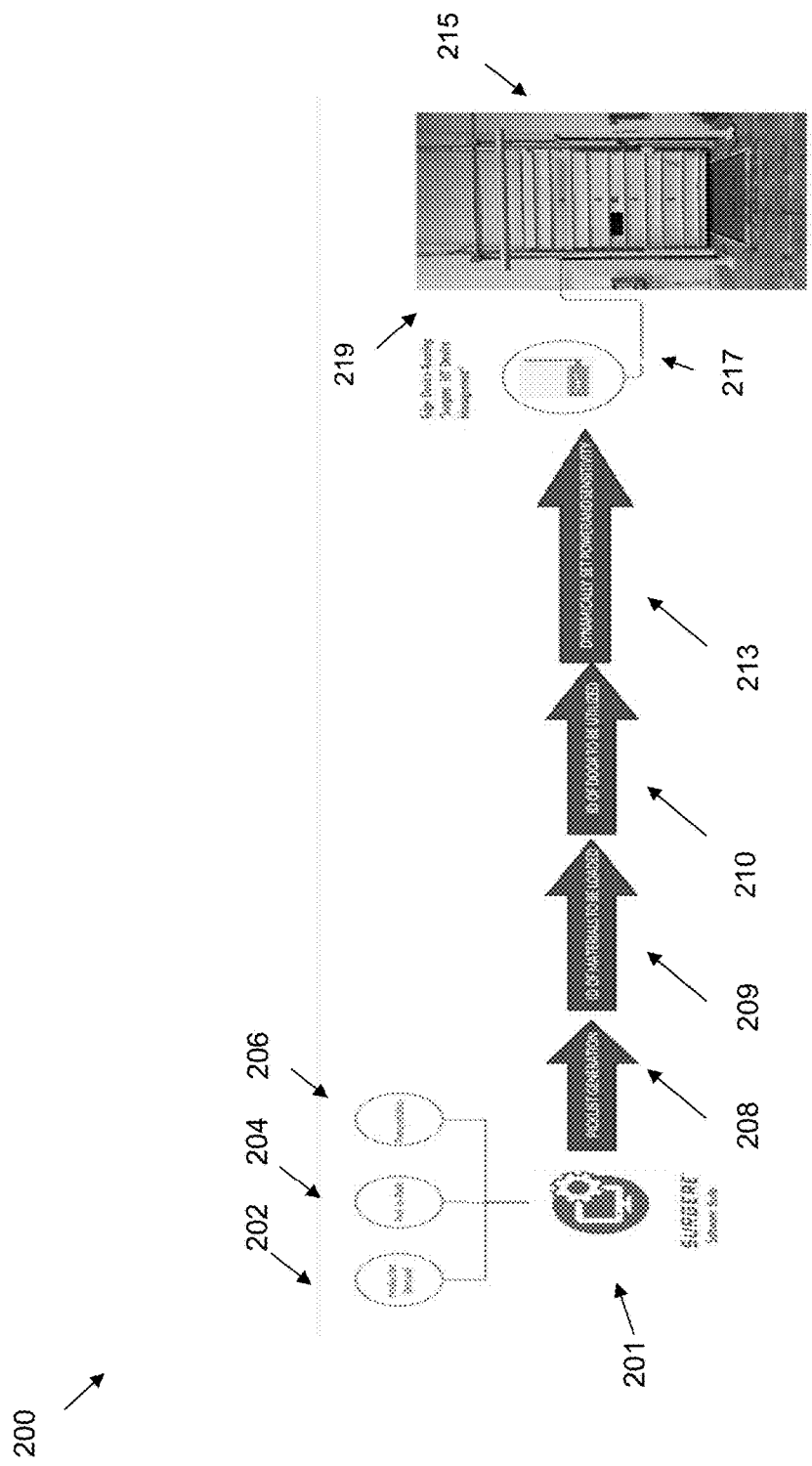
FIG. 8 is a diagram illustrating a modified flowchart of FIG. 7 illustrating a method/system of dynamic modulation and showing an edge device, according to embodiments.

Referring now to FIG. 8, set forth therein is a diagram illustrating an example method/system 200 as a modified flowchart of FIG. 7 including edge device 217, according to embodiments of the invention. As shown therein, method/system 200 comprises at 202 an integration of product demand data to an Internet of Things (IoT) platform (INTERIUS/COS Database/Software Suite 201) which provides data analytics and is a proprietary cloud based software which can use RFID sensors to gather activity data, which is then used to track assets, such as reusable automotive containers and other parts, through each link in a supply chain. Product demand data may include details regarding production plans for volume of finished goods and/or vehicle production, and the parts required from the supply based needed to meet the production plan. FIG. 8 further shows at 204 integration of part to pack data to the IoT Platform (INTERIUS/COS Database/Software Suite 201). The part to pack data may include, e.g., a) the container, rack or corrugate box each part ships in; b) pack and/or part specifications including size/dimensions, material type such as plastic, steel, etc., weight, packs per pallet, and whether the material is stackable; and c) what RFID brand, model, chipset is utilized on the pack or asset and location on the asset where the tag is placed. FIG. 8 also shows at 206 integration of transportation data to the IoT platform (INTERIUS/COS Database/Software Suite 201). The transportation data may comprise, e.g., details regarding what carriers have been scheduled to pick up material at the manufacturing facility, how many trailers will be arriving, the time the trailers will be arriving, and identification of the predetermination destination for the carrier. At 208, an INTERIUS/COS Database/Software Suite 201 generated pick list may utilize, e.g., production demand, real time inventory at the manufacturer and supply base, and scheduled transportation to determine what assets/containers need to be loaded on outbound trailers, as well as the quantity of the same; see 209 identification of materials. At 210, it is determined whether a dock door is in use (e.g., identification of door to be utilized). If the dock door is not in use or scheduled to be in use, the RFID dock door portal may be dynamically modulated to be tuned downed and thus set to minimal power and minimal sensitivity setting, or possibly to an off position to conserve energy resources. If it is determined that the dock door (see, e.g., 215) is in use or scheduled to be in use, e.g., a fork truck driver accepts a pick via on-board tablet running the IoT Platform (INTERIUS/COS Database/Software Suite 201) and selects the dock door they will be utilizing to load the material/assets, followed by determining the material/assets to be loaded, interrogate part to pack information in the INTERIUS/COS Database/Software Suite 201 to, e.g., a) identify RFID tag type; b) RFID tag placement; c) material complexion; and d) entirety of material to be loaded. The data set may be utilized to cross check extensive portal setting testing during on site launch to dynamically modulate at 213 the portal/reader to settings (e.g., power, sensitivity, reader mode) to best capture about 100% of tagged assets while simultaneously not creating RFID energy equivalent to capturing RFID reads at adjacent doors that also may be in use.

It is further noted that the INTERIUS/COS Database/Software Suite 201 comprises software that performs processing and it is a cloud based solution. Edge device 217 conducts processing taking place at, e.g., the sensors located at dock door 215 and includes, e.g., the antenna(s), computer/processor for the edge computing. Advantageously, there may be multiple or many edge devices 217 for distributed processing. Edge device(s) 217 may be utilized to conduct initial pre-processing of data via algorithms with desired embedded code. According to embodiments, there is advantageously the ability to individually and remotely control the edge device(s) 217 regarding, e.g., mode, modulation, and power settings. Thus, proprietary code may be embedded in the computer of the edge device(s) 217 and common communication protocols may be used to access and run the communication. For example, the edge device(s) 217 or portal/reader (computer) can receive signals from the antenna(s) and processes the antenna data that reads the tags (unique serial number). The portal/reader can be dynamically configured to optimize the ability to read all of the tag types.

Set forth below are further details regarding dynamically tuning the portal, according to embodiments. The dynamic tuning may begin with an understanding of whether, e.g., the dock door (location of the portal) is in use or not. This may be identified through the presence of what is referred to as a lane assignment. Lane assignments can be manually created in the Surgere application, or managed through an interface with the customer's transportation system, from which an understanding of scheduled shipments/departures along with time may be provided. Once a lane assignment has been created, the details from a content or type of material to be loaded perspective may be identified, as referenced by information provided through a customer lane assignment interface. Embodiments of the herein systems may instruct users on what to load on outbound trailers. The details from an asset or content standpoint may include: Asset material (plastic/metal), Asset size, Quantity of asset per pallet, Tag location, Tag type, Tag model, and Tag chip type. Each dock door can be assigned an environmental ID in the Surgere application. This environmental ID may be a 4 digit code, that can reference the different possible combinations of environmental factors that could influence or impact RFID data capture such as, but not limited to: A metal charging station being present adjacent to the door, Material being staged near the door, Metallic shavings in the concrete floor, Lack of a dock plate at the door, Unusually close adjacent doors, Adjacent metal racks, Temperature, Humidity, and Activity at adjacent door, and so forth.

At the initiation of each lane assignment, the door may be marked as active. The system can evaluate the type of material to be loaded in combination with the environmental ID to associate a correct configuration ID to obtain optimal acquisition. The configuration ID can be a unique 4 digit value that represents the unique combinations of reader power, sensitivity, and reader mode programmable at the reader level. The management and assignment of configuration ID's may be determined at the application layer, and managed at the device or edge level. The process may repeat for each established lane assignment in the application, according to embodiments.

Additionally, for portals that are not active, the portal power may be reduced or eliminated so that spurious signals are not received by the active portal; thereby increasing its read rate accuracy.

The system can also identify instances whereby adjacent portals are both in active mode, which can influence the environmental ID associated for these portals.

As a non-limiting example, in view of pre-knowledge based on shipping information, etc., if it is known that A and B tag types, but not C and D tag types, are going to be present, the portal/reader may be dynamically tuned to optimize performance for A and B tag types. This tuning is a dynamic change and may occur in real time and within minutes or seconds of receiving the knowledge of the particular tag types. As a further non-limiting example and regarding a group of A, B, C, D tag types without initial identification of such, all tags may be initially read and if, e.g., it is determined that A and B tag types are present, as opposed to B and C tag types, then the focus can turn to the identified A and B tag types and dynamically tune and optimize the portal/reader for these parameters.

Thus, according to embodiments, assets can be effectively and efficiently tracked, which improves inventory management. The herein disclosed methods and systems may include tagging various assets with passive transmitter tags, as explained above. These tagged assets may then be tracked/read by fixed transceivers/scanning devices, as also explained above. These scanning devices may be positioned according to the designated areas, such as at dock door 215 within a facility, and may be standard RFID fixed portals including one RFID reader and two proprietary antennas per portal, as also explained above. FIG. 8 shows a non-limiting example of fixed scanning device 219 such an RFID fixed portal 219. Fixed portal 219 can automatically read the information of a tagged asset and update this information in the cloud as the tagged asset is moved near the fixed portal 219. The fixed portal 219 may be freestanding or somewhat movable around a facility with a remote power source (e.g., battery, solar panel) and wireless networking capabilities (e.g., Wi-Fi, cellular). The fixed portal 219 may be installed or positioned as desired, and may possibly even be connected to existing lamp posts, light fixtures, lighted signs, garage doors, or other items that could structurally support a fixed portal and has an existing legacy power grid.

In some embodiments, the afore-described passive transmitter tags read by the fixed portal 219 may include unique identification information, such as a serial number. The passive transmitter tag and asset identification information may be scanned/read by the fixed portal 219, which may associate the asset identification information with the unique identification information of the passive transmitter tag in the databased stored in the cloud.

In some embodiments, the manufacturer may apply the passive transmitter tag to the asset. The manufacturer or a computer may automatically codes or programs the passive transmitter tag to include asset identifying information, to the signal that is to be transmitted by the passive transmitter tag. Fixed portal 219 may read such passive transmitter tags, as explained above, and information may be transferred to the central cloud server having program logic and a non-transitory storage medium having instructions encoded thereon that when executed by one or more processors perform operations to identify and track the asset. The central cloud server may store asset information in a format configured to easily recall and obtain information therefrom for later use.

In some embodiments, the passive transmitter tag may be an RFID chip or tag. For example, the passive transmitter tag may use the AIAG GS1 GRAI 96 RFID Tag Standard, which is flexible and allows for add-on functionality. Other transmitters associated with identifying information of an asset are also possible. The scanning device 219 may be fixed RFID transceivers and/or portals, including one RFID reader and at least two antennas per portal, as explained above. Alternatively, the scanning device 219 may each include a single antenna. The scanning device 219 may transmit the information about the asset to a central cloud server, which may be coupled to a non-transitory storage medium.

In some embodiments, the system/method may include encoding logic configured to associate the passive transmitter tag with asset identification information, such as serial number.

In some embodiments, the methods and systems herein may include software and/or other applications to be run on a computer or mobile device. For example, the systems may include a non-transitory computer readable storage medium having instructions encoded thereon, that when executed by one or more processors (which may also be referred to as "logic") track and identify the assets. The system software may allow a user to search the database stored on the cloud server for asset identification information and/or unique identification information of the passive transmitter tag via a user interface.

For example, a device in communication with the systems herein may import, scan, or otherwise receive input of, e.g., the RFID serial number for an asset. The system software may the query the database for information about a given asset. In response, the system software may display information for the asset. Software functionality may be available in Container Optimization Solutions (COS)/INTERIUS software. The software may be a web-based application. An instance of COS/INTERIUS may be customized for the manufacturing facility to add extra functionality, however there are several areas that may be turnkey and available without further development. The system may use Simple Object Access Protocol (SOAP) or Representational State Transfer (REST) web services to integrate with customers as they are scalable and easily deployed but are open to other methods and have experience with the same. In some embodiments, users may view location information and produce reports via the software.

As shown in FIG. 9 and FIG. 10, according to embodiments, data may be stored in table 400 of a COS/INTERIUS database (dynamic modulation database), accessible via a computer and/or a mobile device. FIG. 9 and FIG. 10 depict data for a door in use and a door not in use, respectively. In particular, table 400 shows stored information regarding door or portal status (active/not active), material to be loaded, settings, etc. The table 400 is presented to assist in modulating power, settings, etc. The table 400 may be displayed to a user on a dynamic user interface and may include information/data elements to modulate as further described below. As illustrated in table 400 and according to embodiments, Lane Assignment 402 concerns the function that occurs in the application to indicate that a door will be in use, and associate additional details to the transaction such as destination, carrier, etc. Thus, the presence of an active lane assignment indicates that a door is in use. Created Date 404 indicates the time and date at which the lane assignment was open and the door is in active use. A Closed Date (not shown) could also be present indicating the time and date at which the lane assignment was closed, material has been loaded and the door is no longer in use. Pick List ID 406 concerns the application generating picks for, e.g., customers/clients that instruct what to load from a material and quantity standpoint. The ID is the reference that will specifically identify what will be loaded (material, material type, quantity, etc.) on a truck or trailer during an active lane assignment. Door 408 indicates e.g., the specific dock door that will be used during an active lane assignment and with this information it can be determined what specific RFID portal/reader is involved from a modulation perspective. Origin 410 identifies the plant location of the door, also leveraged for modulation purposes. Destination 412 is ancillary to the modulation process and identifies material shipping location. Carrier 414 indicates type of transport carrier. Trailer 416 identifies the particular trailer that will be providing a transport for the loaded trailer and is also ancillary to modulation. Asset Type(s) 418 identifies what specific assets are to be loaded. Further information regarding these assets may be gained from the integration with, e.g., customer's part/pack management applications. An understanding can then be made regarding material type, dimensions weight, presence of dunnage, tag placement, tag type, etc. that allows for a refinement from a modulation perspective. Activity ID 420 indicates whether the door is active or not. Environmental ID 422 concerns environmental factors that may impact modulation such as, e.g., environmental conditions at the loading location including, e.g., presence of metal, proximity to nearest door, presence of adjacent staged material and so forth. These factors may be known based on plant site surveys. Asset types, tag types and placement may also be considered. For example, tag placement (e.g., Top, Bottom), tag model (e.g., AD383-U7, Metalcraft), tag chip (e.g., Monza 6, Monza 7), container material (e.g., Plastic A, Plastic B, Metal, ESD) and container configuration (e.g., Single Stack, Double Stack, Palletized, Nested) may be considered and set forth in the table 400. Environmental ID 422 can include unique combinations of environmental factors of a series of environmental IDs. Environmental factors of the Environmental ID 422 can be considered and impact Configuration ID 424, which is a modulation parameter including power setting, sensitivity and reader mode determined to yield the best results for each environmental ID, according to embodiments.

Power 426, Sensitivity 428 and Reader Mode 430 are further set forth in Table 400. According to embodiments, power may be set in decibels per milliwatt (dBm). The lowest setting may be 10.00 dBm and the maximum setting may be 33.0 dbM. Regarding sensitivity, a receive/sensitivity value may be the offset in dB that the reader will implement from its lowest (e.g., most sensitive) receive sensitivity to filter out tag reads if the received signal strength indicator (RSSI) is too low. The receive/sensitivity value may be 0 by default, indicating that the reader is at its lowest receive setting and thus not filtering out tag reads. The settings may range from 0 to −80, and a read with a RSSI of −80 is a stronger read than a read with a value of zero. Additionally, reader mode options may include Max throughput, Hybrid, Dense Reader M4, Dense Reader M8, Max Miller, Dense Reader M4 Two, AutoSet Dense Reader and AutoSet Static Fast.

It is further noted that the data displayed in the table 400 may be manually editable for updating based on a permissions level.

"Logic", as used herein, may include but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of systems described herein may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

Accordingly, in some embodiments, a method of dynamic radio frequency identification (RFID) modulation comprises identifying in a structure a plurality of different assets to be loaded or unloaded; wherein each asset of the plurality of different assets is of a known identification and includes a passive RFID tag, and all passive RFID tags of the plurality of different assets are not the same. The method also comprises identifying a selected structural opening of a plurality of structural openings to be utilized with unloading or loading of the plurality of different assets, wherein each structural opening of the plurality of structural openings is equipped with an RFID portal including a reader, and each RFID portal includes at least power, sensitivity, mode and off settings; and individually, dynamically tuning the power, sensitivity and mode settings of the RFID portal of the selected structural opening based on the known identification of the plurality of assets and RFID tags utilized in the selected structural opening such that the reader of the RFID portal of the selected structural opening reads every RFID tag of the plurality of different assets to avoid missed reads.

In some embodiments, the method further comprises identifying time and date a transport vehicle is arriving at the selected structural opening for the unloading or loading and performing the individually, dynamically tuning at the time and date.

In some embodiments, the structural openings are dock doors and the method further comprises identifying which selected structural openings of the plurality of structural openings are inactive and not receiving a transport vehicle for the plurality of different assets to be loaded onto or off of the transport vehicle at the time and date, and individually, dynamically tuning each RFID portal of the inactive dock doors to the off setting or reduced power and sensitivity settings in order to conserve resources.

In some embodiments, the assets include assets include automotive assets.

In some embodiments, the assets include containers for automotive parts.

In some embodiments, the structure includes at least one of a warehouse, a supplier facility and a manufacturing facility.

In some embodiments, the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag.

In some embodiments, the portal includes two reader antennas.

In some embodiments, the dynamically tuning further comprises initiating a lane assignment for a selected dock door and identifying the selected dock door as active.

In some embodiments, the dynamically tuning further comprises identifying content of the assets to be loaded or unloaded, wherein the content comprises at least one of asset material, asset size, quantity, tag location, tag model and tag chip type.

In some embodiments, the dynamically tuning further comprises evaluating the content of the assets in combination with an environmental identification (ID) indicating environmental factors, wherein the environmental factors include at least one of temperature, humidity, and activity at an adjacent door.

In some embodiments, an edge device management system for dynamic radio frequency identification (RFID) modulation comprises a plurality of different assets configured to be loaded or unloaded; wherein each asset of the plurality of different assets is of a known identification and includes a passive RFID tag, and all passive RFID tags of the plurality of different assets are not the same. The edge device management system also comprises a plurality of RFID portals including a reader; wherein the edge device management system is configured to identify a selected structural opening of a plurality of structural openings to be utilized with loading or unloading the plurality of different assets, wherein each structural opening of the plurality of structural openings is equipped with an RFID portal of the plurality of RFID portals including a reader, and each RFID portal includes at least power, sensitivity, mode and off settings; and wherein the edge device management system is further configured to individually, dynamically tune the power, sensitivity and mode settings of the RFID portal of the selected structural opening based on the known identification of the plurality of assets and RFID tags utilized in the selected dock door such that the reader of the RFID portal of the selected structural opening reads every RFID tag of the plurality of different assets to avoid missed reads.

In some embodiments, the edge device management system is further configured to identify time and date a transport vehicle is arriving at the selected structural opening and perform the individually, dynamically tuning at the time and date.

In some embodiments, the structural openings are dock doors and the edge device management system is further configured to identify which structural openings of the plurality of structural opening are inactive and not receiving a transport vehicle for the plurality of different assets to be loaded onto or off of the transport vehicle at the time and date, and individually, dynamically tune each RFID portal of the inactive dock doors to the off setting or reduced power and sensitivity settings in order to conserve resources.

In some embodiments, the assets include automotive assets.

In some embodiments, the assets include containers for automotive parts.

In some embodiments, the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag.

In some embodiments, the portal includes two reader antennas; and the edge device is configured to communicate with the plurality of RFID portals.

In some embodiments, the edge device management system is configured to receive production demand data, asset data and transportation data.

In some embodiments, the system is further configured to initiate a lane assignment for a selected dock door and identifying the selected dock door as active.

In some embodiments, the system is further configured to identify content of the assets to be loaded or unloaded, wherein the content comprises at least one of asset material, asset size, quantity, tag location, tag model and tag chip type.

In some embodiments, the system is further configured to evaluate the content of the assets in combination with an environmental identification (ID) indicating environmental factors, wherein the environmental factors include at least one of temperature, humidity, and activity at an adjacent door.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" may be used herein to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of any preferred embodiments/aspects of the disclosure are an example and the disclosure is not limited to the exact details shown or described.

Although disclosed systems and methods are illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are contemplated hereby. Additionally, all elements, features, steps, etc., disclosed herein may be used in any combinations.

What is claimed is:

1. A method of dynamic radio frequency identification (RFID) modulation comprising:
    identifying in a structure a plurality of different assets to be loaded or unloaded; wherein each asset of the plurality of different assets is of a known identification and includes a passive RFID tag, and all passive RFID tags of the plurality of different assets are not the same;
    identifying a selected structural opening of a plurality of structural openings to be utilized with unloading or loading of the plurality of different assets, wherein each structural opening of the plurality of structural openings is equipped with an RFID portal including a reader, and each RFID portal includes at least power, sensitivity, mode and off settings; and
    using an edge device management system integrated with a shipping system, analyzing details of where and when material will be loaded or unloaded and what specific material types will be loaded or unloaded for the selected structural opening, determining the RFID portal of the selected structural opening for use and individually, dynamically tuning and configuring the RFID portal of the selected structural opening through real-time modification of its reader power, sensitivity and mode to settings of the RFID portal of the selected structural opening with highest rate of acquisition and minimal creation of excess read energy to acquire data with the highest potential accuracy while minimizing excess energy not needed for the acquisition and based on the known identification of the plurality of assets and RFID tags utilized in the selected structural opening such that the reader of the RFID portal of the selected structural opening reads every RFID tag of the plurality of different assets to avoid missed reads.

2. The method of claim 1, further comprising identifying time and date a transport vehicle is arriving at the selected structural opening for the unloading or loading and performing the individually, dynamically tuning at the time and date.

3. The method of claim 2, wherein the structural openings are dock doors, and the method further comprise identifying which selected structural openings of the plurality of selected structural openings are inactive and not receiving a transport vehicle for the plurality of different assets to be loaded onto or off of the transport vehicle at the time and date, and individually, dynamically tuning each RFID portal of the inactive dock doors to the off setting or reduced power and sensitivity settings in order to conserve resources.

4. The method of claim 2, wherein the assets include automotive assets.

5. The method of claim 4, wherein the assets include containers for automotive parts.

6. The method of claim 3, wherein the structure includes at least one of a warehouse, a supplier facility and a manufacturing facility.

7. The method of claim 1, wherein the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag.

8. The method of claim 7, wherein the portal includes two reader antennas.

9. The method of claim 3, wherein the dynamically tuning further comprises initiating a lane assignment for a selected dock door and identifying the selected dock door as active.

10. The method of claim 9, wherein the dynamically tuning further comprises identifying content of the assets to be loaded or unloaded, wherein the content comprises at least one of asset material, asset size, quantity, tag location, tag type, tag model and tag chip type.

11. The method of claim 10, wherein dynamically tuning further comprises evaluating the content of the assets in combination with an environmental identification (ID) indicating environmental factors, wherein the environmental factors include at least one of temperature, humidity, and activity at an adjacent door.

12. The method of claim 1, wherein the RFID tags are of known specific types and the RFID portal is tuned to only read the known specific types of the RFID tags.

13. An edge device management system for dynamic radio frequency identification (RFID) modulation comprising:
 a plurality of different assets configured to be loaded or unloaded; wherein each asset of the plurality of different assets is of a known identification and includes a passive RFID tag, and all passive RFID tags of the plurality of different assets are not the same;
 a plurality of RFID portals including a reader;
 wherein the edge device management system is configured to identify a selected structural opening of a plurality of structural openings to be utilized with loading or unloading the plurality of different assets, wherein each structural opening of the plurality of structural openings is equipped with an RFID portal of the plurality of RFID portals including a reader, and each RFID portal includes at least power, sensitivity, mode and off settings; and
 wherein the edge device management system is integrated with a shipping system and configured to analyze details of where and when material will be loaded or unloaded and what specific material types will be loaded or unloaded for the selected structural opening, determine the RFID portal of the selected structural opening for use and individually, dynamically tune and configure the RFID portal of the selected structural opening through real-time modification of its reader power, sensitivity and mode to settings of the RFID portal of the selected structural opening with highest rate of acquisition and minimal creation of excess read energy to acquire data with the highest potential accuracy while minimizing excess energy not needed for the acquisition and based on the known identification of the plurality of assets and RFID tags utilized in the selected structural opening such that the reader of the RFID portal of the selected structural opening reads every RFID tag of the plurality of different assets to avoid missed reads.

14. The edge device management system of claim 13, wherein the system is further configured to identify time and date a transport vehicle is arriving at the selected structural opening for the unloading and loading and perform the individually, dynamically tuning at the time and date.

15. The edge device management system of claim 14, wherein the structural openings are dock doors and the system is further configured to identify which structural openings of the plurality of structural openings are inactive and not receiving a transport vehicle for the plurality of different assets to be loaded onto or off of the transport vehicle at the time and date, and individually, dynamically tune each RFID portal of the inactive dock doors to the off setting or reduced power and sensitivity settings in order to conserve resources.

16. The edge device management system of claim 14, wherein the assets include automotive assets.

17. The edge device management system of claim 16, wherein the assets include containers for automotive parts.

18. The edge device management system of claim 14, wherein the portal includes a reader antenna configured to transmit an interrogation signal, and each RFID tag includes a tag antenna configured to receive the interrogation signal and, in response to receiving the interrogation signal, provide an identification (ID) response representing an identity of the respective RFID tag.

19. The edge device management system of claim 14, wherein the portal includes two reader antennas.

20. The edge device management system of claim 14, comprising an edge device configured to communicate with the plurality of RFID portals.

21. The edge device management system of claim 20, wherein the system is configured to receive production demand data, asset data and transportation data.

22. The edge device management system of claim 15, wherein the system is configured to initiate a lane assignment for a selected dock door and identifying the selected dock door as active.

23. The edge device management system of claim 22, wherein the system is configured to identify content of the assets to be loaded or unloaded, wherein the content comprises at least one of asset material, asset size, quantity, tag location, tag type, tag model and tag chip type.

24. The edge device management system of claim 23, wherein the system is configured to evaluate the content of the assets in combination with an environmental identification (ID) indicating environmental factors, wherein the environmental factors include at least one of temperature, humidity, and activity at an adjacent door.

25. The edge device management system of claim method of claim 13, wherein the RFID tags are of known specific types and the RFID portal is tuned to only read the known specific types of the RFID tags.

* * * * *